C. LIMBURG & W. D. SEGELHORST.
VENTILATING APPARATUS.
APPLICATION FILED FEB. 5, 1914.

1,133,047.

Patented Mar. 23, 1915.
2 SHEETS—SHEET 1.

WITNESSES

INVENTORS

C. LIMBURG & W. D. SEGELHORST.
VENTILATING APPARATUS.
APPLICATION FILED FEB. 5, 1914.
1,133,047.
Patented Mar. 23, 1915.
2 SHEETS—SHEET 2.
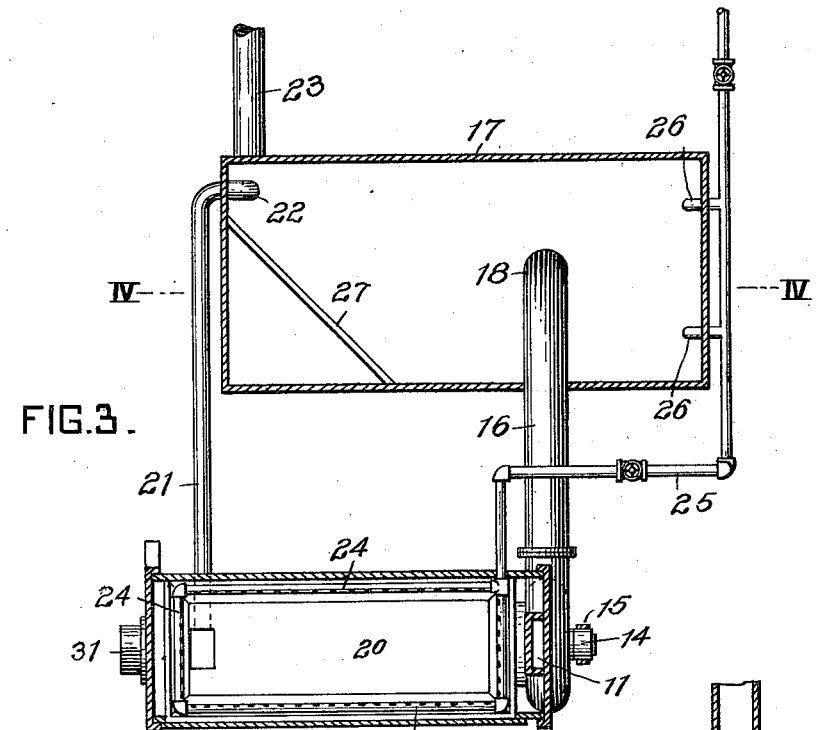
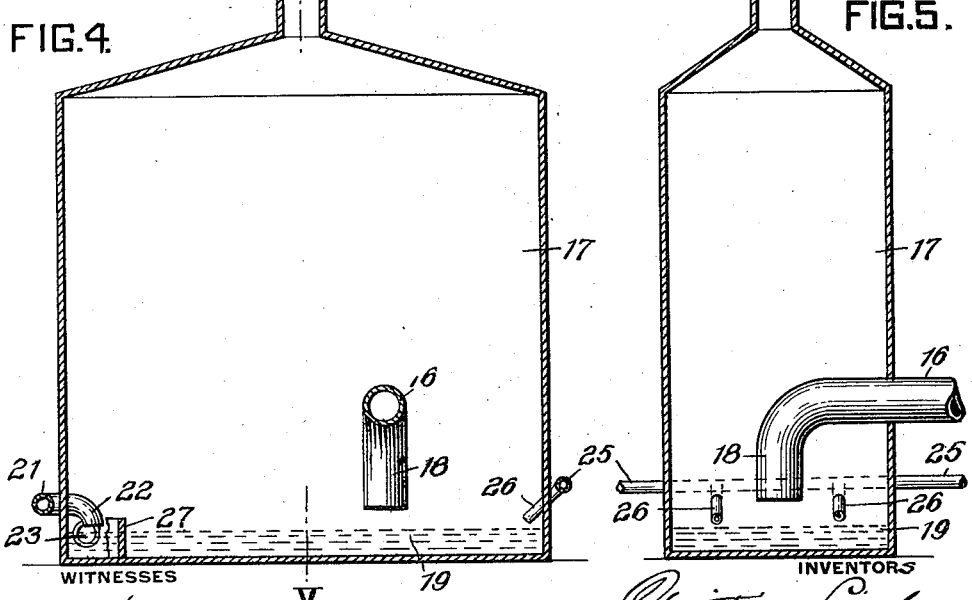

UNITED STATES PATENT OFFICE.

CHRISTIAN LIMBURG AND WILLIAM D. SEGELHORST, OF PITTSBURGH, PENNSYLVANIA.

VENTILATING APPARATUS.

1,133,047.  Specification of Letters Patent.  Patented Mar. 23, 1915.

Application filed February 5, 1914. Serial No. 816,706.

*To all whom it may concern:*

Be it known that we, CHRISTIAN LIMBURG and WILLIAM D. SEGELHORST, citizens of the United States, residing at Pittsburgh, in the county of Allegheny and State of Pennsylvania, have invented certain new and useful Improvements in Ventilating Apparatus, of which the following is a specification.

Our invention consists of an improvement in ventilating apparatus, and is particularly designed for the purpose of ventilating a coffee roasting machine for the purpose of removing therefrom the waste matter of the coffee or other material being roasted, and also to effect collection and carrying off of waste matter carried by the gases of combustion, or otherwise.

The invention consists generally in combining with a machine of the type indicated, and operating to separate refuse matter from the material being operated upon, and utilizing fuel in combustion, means operating by air suction to carry off the light refuse material and products of combustion, and to discharge them into a suitable collecting element or medium.

While the invention is applicable to various uses and adaptations, the preferred embodiment herein illustrated and described is in connection with a coffee roaster of a well-known type.

Figure 1:
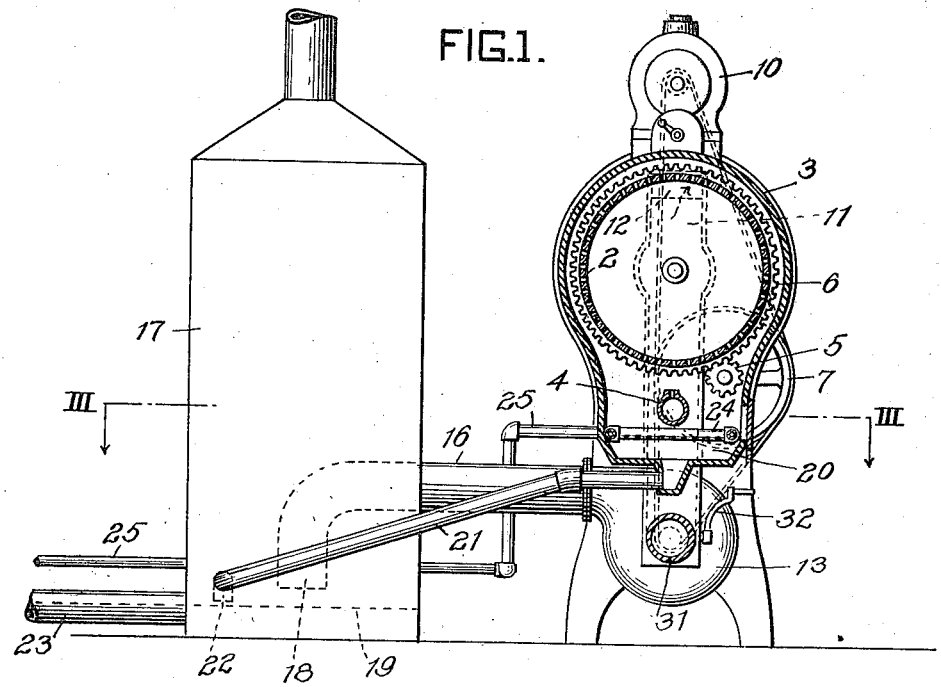
Figure 2:
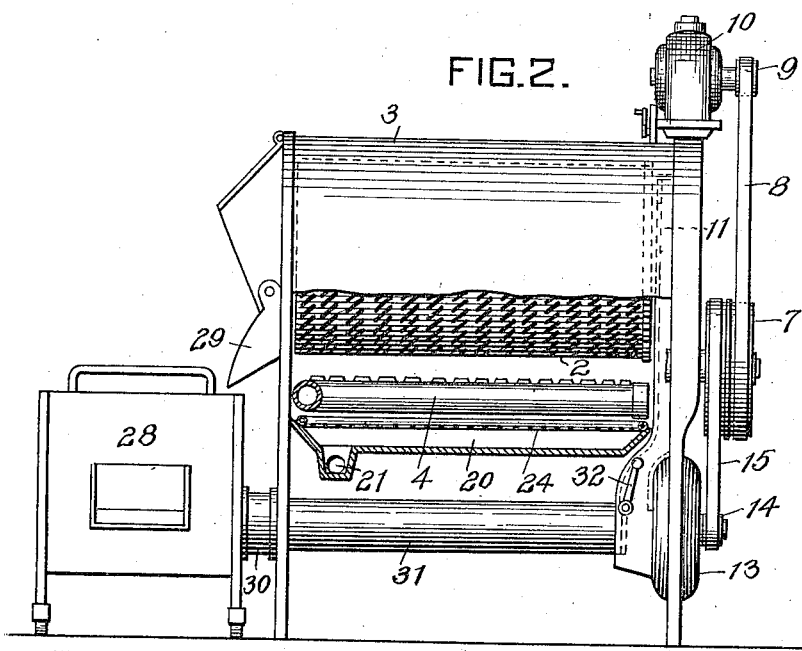

Referring to the drawings illustrating such application of the invention,—Figure 1 is a sectional elevation showing the application of the invention to a coffee roaster. Fig. 2 is a view of the apparatus in side elevation, partly broken away. Fig. 3 is a sectional plan view of the apparatus illustrating the water supply fluid circulation. Fig. 4 is a vertical sectional view of the collecting chamber, indicated by the line IV. IV. of Fig. 3. Fig. 5 is a transverse sectional view, indicated by the line V. V. of Fig. 4.

The coffee roasting machine, which is of well-known construction, and to which the present invention is particularly applicable, comprises generally an inner perforated rotatable barrel 2 mounted upon supporting trunnions or bearings in any suitable manner within an outer surrounding shell or case 3, annually spaced beyond the barrel for circulation of the products of combustion of any suitable fuel. For such purpose, a gas burner 4 is located within the casing 3 below the rotatable barrel 2, for roasting the contents thereof during rotation of the barrel by any suitable means, as gearing 5, 6, and a pulley 7 driven by belt 8 from pulley 9 of a driving motor 10. The gaseous products of combustion, together with any foreign or waste matter carried thereby in suspension, are drawn off from the interior of the casing 3 by a conduit 11 opening at any suitable point, as by port 12, into the interior space, the conduit 11 communicating with a suction fan 13 also driven by pulley 14 and belt 15 from pulley 7. From fan 13 a conduit 16 leads outwardly to any suitable point of discharge, ordinarily into a flue or smoke stack.

In the usual operation of machines of this class, rotation of barrel 2 with its contained coffee or other material being roasted, loosens and separates the surrounding chaff, bran or other material, which is of a light, highly combustible nature. Such material ordinarily passes outwardly through the perforations of the drum into the surrounding space, and frequently causes objectionable or dangerous combustion, with accompanying noxious odors and other objectionable results. The material, when discharged into a flue, frequently accumulates there, and is likely to effect dangerous combustion, or passes out of the flue in its original state, or as partly or wholly burnt products of combustion, into the surrounding atmosphere, and is of an objectionable and soiling nature. Our invention has in view to completely eliminate these objections and to positively discharge all of the loose discharged waste material, and any matter carried in suspension by the waste gases, into a collecting chamber and a water bath or current of water passing therethrough, as hereinafter described. For the purpose of so positively collecting the waste matter of whatever nature, we provide, at any convenient position adjacent to the coffee roaster, the collecting chamber 17, into which the conduit 16 directly discharges the gases, products of combustion, and suspended waste matter, by its downwardly turned terminal 18, extending to within a short distance above the level of a water bath 19 therein. Immediately below the burner 4 extending across the area of the space within the outer surrounding casing, we provide a collecting pan 20, from which, by conduit 21, are carried off the fluid contents of the pan and discharged by terminal 22 into the interior of chamber 17, preferably adjacent to the outlet 23 thereof, leading to a sewer or elsewhere.

For the purpose of dampening the light, loose inflammable chaff or other waste matter discharged from the drum, we provide a spray pipe 24, extending around the upper edge portions of pan 20, having series of jet openings directed downwardly and inwardly so as to provide a copious supply of spray water in any desired volume, within the control of suitable regulating valves, as will be readily understood. Water is supplied to spray pipes 24 by a pipe 25, from which, or from any other source of supply, one or more water supply pipes 26 are introduced to the chamber 17, by which a copious supply of water may be provided at all times within the bottom portion of chamber 17. Outlet 23 is located sufficiently high above the bottom of the chamber to insure sufficient depth of water at all times to provide a receiving and absorbing bath.

A deflecting bar or ledge 27 may be arranged across one corner of the chamber, as indicated in Fig. 3, whereby to direct the contents toward the outlet conduit 23.

As shown in Fig. 2, a receiving hopper, box, or coaling car 28, mounted upon casters for easy moving over the floor, is used to receive the roasted coffee from the machine through spout or chute 29. Hopper 28 is provided with a telescoping outlet connection 30 adapted to be interfit with the end of an extension conduit 31, communicating with fan 13 through a valve or damper-controlled opening, so that when the roasted coffee is discharged into the hopper, any remaining loose material may also be drawn off from it by the fan and discharged in the same manner as above described. The damper is provided with an operating handle 32 by which it may be closed at other times and during the roasting operation.

The operation of the invention will be readily understood from the foregoing description.

The various waste products are all positively drawn off from the interior of the machine and delivered into or upon the surface of the water bath, any gaseous products of combustion passing upwardly through chamber 17 and outwardly by conduit 33 to a suitable stack or flue. By this means the products of combustion are effectually separated from their eliminated suspended matter, which, with the other waste matter, is carried off by the water bath.

It will be understood that the invention may be variously changed or modified in construction, details, or otherwise by the skilled mechanic within the scope of the following claims.

What we claim is:

1. The combination with an inclosing casing embodying a combustion chamber, and means for supplying fuel in combustion thereto; of a separate collecting chamber having a water inlet supply, a water outlet conduit arranged to maintain a water bath therein, a gas outlet therefrom, and a suction fan connected with the combustion chamber and the collecting chamber and having a branch damper-controlled suction conduit for connection with a separate receptacle.

2. An outer casing for a roasting machine of the class described providing a combustion and circulation chamber, a suction fan communicating with said chamber, a separate collecting chamber, a conduit connecting the suction fan with said chamber, a water-sprayed pan in the base of the casing, and a conduit leading therefrom to the collecting chamber.

3. An outer casing for a roasting machine of the class described providing a combustion and circulation chamber, a suction fan communicating with said chamber, a separate collecting chamber, means for supplying to and exhausting water therefrom and providing a water bath therein, a conduit connecting the suction fan with said chamber, a water-sprayed pan in the base of the casing, and a conduit leading therefrom to the collecting chamber.

4. An outer casing for a roasting machine of the class described having a cylindrical upper portion and a rectangular base providing a combustion and circulation chamber, a fuel burner therein, a collecting pan below the fuel burner in said base, means for supplying water to said pan, a separate collecting chamber, a conduit leading from the collecting pan to said chamber, and a suction conduit connected with the upper portion of the outer casing and with the collecting chamber embodying a suction fan.

5. In combination, an outer casing for a roasting machine of the class described providing a combustion and circulation chamber, a suction fan communicating with the upper portion of said chamber, a collecting chamber having a gas outlet conduit, means for supplying to and exhausting water therefrom and providing a water bath therein, a fuel burner within the combustion chamber, a collecting pan below the fuel burner, means for supplying a surrounding water spray thereto, a conduit connecting said pan with the collecting chamber, and a conduit connecting the suction fan with the collecting chamber, substantially as set forth.

6. In a ventilating apparatus for a coffee roasting machine, the combination of an inclosing casing having a cylindrical upper portion for reception of a separator and a rectangular base, a collecting pan within the base of the casing, a surrounding water spray pipe having supply openings for directing a spray thereinto, a fuel burner located upwardly above said pan, a separate collecting chamber having an upper gas outlet, means for supplying water to said chamber and for carrying water and waste material away therefrom, a conduit leading by gravity from said pan to said chamber and terminating adjacent the outlet thereof, a suction conduit communicating with the upper end portion of the casing, a suction fan connected therewith, and a conduit from said fan leading to the collecting chamber.

7. In a ventilating apparatus for a coffee roasting machine, the combination of an inclosing casing having a cylindrical upper portion for reception of a separator and a rectangular base, a collecting pan within the base of the casing, a surrounding water spray pipe having supply openings for directing a spray thereinto, a fuel burner located upwardly above said pan, a separate collecting chamber having an upper gas outlet, means for supplying water to said chamber and for carrying water and waste material away therefrom, a conduit leading by gravity from said pan to said chamber and terminating adjacent the outlet thereof, a suction conduit communicating with the upper end portion of the casing, a suction fan connected therewith, a conduit from said fan leading to the collecting chamber, and a separate suction conduit communicating with said fan and the collecting chamber and adapted to be connected with a separate vessel.

8. In combination, an outer casing for a roasting machine providing a combustion and circulation chamber, a suction fan communicating with said chamber, a separate collecting chamber having an overflow conduit and a deflecting barrier adapted to direct flow of the contents thereto, and a conduit connecting the suction fan with said chamber.

9. In combination, an outer casing for a roasting machine providing a combustion and circulation chamber, a suction fan communicating with said chamber, a separate collecting chamber having an overflow conduit and a deflecting barrier adapted to direct flow of the contents thereto, a conduit connecting the suction fan with said chamber, a water sprayed pan in the base of the casing, and a conduit leading therefrom to the collecting chamber.

In testimony whereof we hereunto affix our signatures in the presence of two witnesses.

CHRISTIAN LIMBURG.
WILLIAM D. SEGELHORST.

Witnesses:
C. M. CLARKE,
FRED'K STAUB.

Copies of this patent may be obtained for five cents each, by addressing the "Commissioner of Patents, Washington, D. C."